United States Patent [19]

Upadhyay et al.

[11] Patent Number: 4,633,382
[45] Date of Patent: Dec. 30, 1986

[54] INVERTER CONTROL SYSTEM

[75] Inventors: Anand Upadhyay; Lawrence W. Messenger, both of Rockford, Ill.

[73] Assignee: Sundstrand Corporation, Rockford, Ill.

[21] Appl. No.: 705,662

[22] Filed: Feb. 26, 1985

[51] Int. Cl.⁴ .......................................... H02M 7/537
[52] U.S. Cl. ..................................... 363/132; 363/41; 363/98; 318/801; 318/808
[58] Field of Search ..................... 363/41, 132, 96, 97, 363/98; 318/807, 808, 801, 802

[56] References Cited

U.S. PATENT DOCUMENTS

| | | | |
|---|---|---|---|
| 3,611,086 | 10/1971 | Mokrytzki et al. | 363/41 X |
| 3,662,247 | 5/1972 | Schieman | 363/41 |
| 3,971,972 | 7/1976 | Stich | 363/41 X |
| 4,187,536 | 2/1980 | Govaert et al. | 363/97 X |

*Primary Examiner*—Patrick R. Salce
*Assistant Examiner*—Emanuel Todd Voeltz
*Attorney, Agent, or Firm*—Wood, Dalton, Phillips, Mason & Rowe

[57] ABSTRACT

AC motor drives which include static inverters typically are operated by inverter controls that are designed according to certain criteria so that the inverter is operated in an efficient manner. Generally, it is desirable to design such a control to reduce as much as possible losses in the motor windings and losses associated with the inverter switches. However, inverters switching losses cannot be reduced without increasing motor losses, and vice versa, since motor losses decrease with increasing PWM frequency while inverter losses decrease with decreasing PWM frequency. In order to overcome this problem, a control system according to the present invention for controlling an inverter which converts DC power into variable frequency AC power for energizing a motor in accordance with an input command includes circuitry coupled to the input command for generating a plurality of waveforms at different frequencies, each frequency being an integer multiple of the frequency of the AC output. PWM circuitry is included for modulating the AC output with a pulse width modulating signal derived from one of the waveforms and switching circuitry for selecting one of the waveforms in dependence upon the frequency of the AC output to maintain a particular voltage to frequency relationship therein. The instant control strikes a balance between reduction of switching losses and reduction of motor losses so that the overall losses are minimized.

3 Claims, 3 Drawing Figures

INVERTER CONTROL SYSTEM

DESCRIPTION

1. Technical Field

The present invention relates generally to power conversion apparatus, and more particularly to a control for an AC motor drive inverter which minimizes the combined losses in the inverter and the motor.

2. Background Art

Variable speed AC motor drives typically include an inverter operated by an inverter control in response to an input speed command. Such types of inverter controls must be designed in accordance with the following criteria: the inverter must be operated to maintain a predetermined relationship between output voltage and output frequency; the voltage and frequency upon startup of the motor from a zero speed condition should initially be a low level and should be brought up to commanded levels in a controlled fashion to minimize inrush currents; the pulse width modulation or PWM frequency should be an integer multiple of six times the fundamental output frequency of the inverter to simplify the design of the inverter control; the current harmonics in the output should be held to a minimum so that motor losses are reduced; and the inverter switching losses should be held to a minimum.

The last two design criteria noted above are, in reality, competing considerations, since in order to minimize the current harmonics, the PWM frequency should be as high as possible while in order to minimize the inverter switching losses, the PWM frequency should be as low as possible.

A prior inverter control is disclosed in Schieman U.S. Pat. No. 3,662,247. The control includes adaptive logic for varying the ratio of the PWM frequency to the fundamental frequency in dependence upon the pulse or notch width in the inverter output. This inverter control, however, does not result in minimized overall losses in the inverter and the motor.

SUMMARY OF THE INVENTION

In accordance with the present invention, a control for an inverter in an AC motor drive operates an inverter in a manner which reduces the overall losses in the inverter and in the motor.

The control of the present invention includes means coupled to an input speed command for generating a plurality of waveforms at different frequencies, each frequency being an integer multiple of the frequency of the AC output of the inverter. Means are included for modulating the AC output with a pulse width modulating signal derived from one of the waveforms including means for selecting one of the waveforms in dependence upon the frequency of the AC output to maintain a particular voltage to frequency relationship therein.

The control of the present invention strikes a balance between the competing considerations of minimization of motor losses and inverter switching losses by maintaining a relationship between PWM frequency and inverter output frequency, which relationship varies with output frequency. The resulting switching losses in the inverter are thereby balanced against the losses in the motor, so that neither reaches excessive levels. This in turn results in a favorable decrease in the overall or combined losses.

In a preferred embodiment of the invention, the PWM frequency is established as integer multiples of six times the output frequency. Further, the inverter output frequency, when starting from a zero speed condition of the motor, is initially established at a small value of the maximum or rated output frequency of the inverter and is increased in a controlled fashion. Also, the control affords constant voltage to frequency (or V-to-F) control and hence each of the above-noted design criteria is met by the instant control in a simple and effective manner.

BEST MODE FOR CARRYING OUT THE INVENTION

Figure 1:
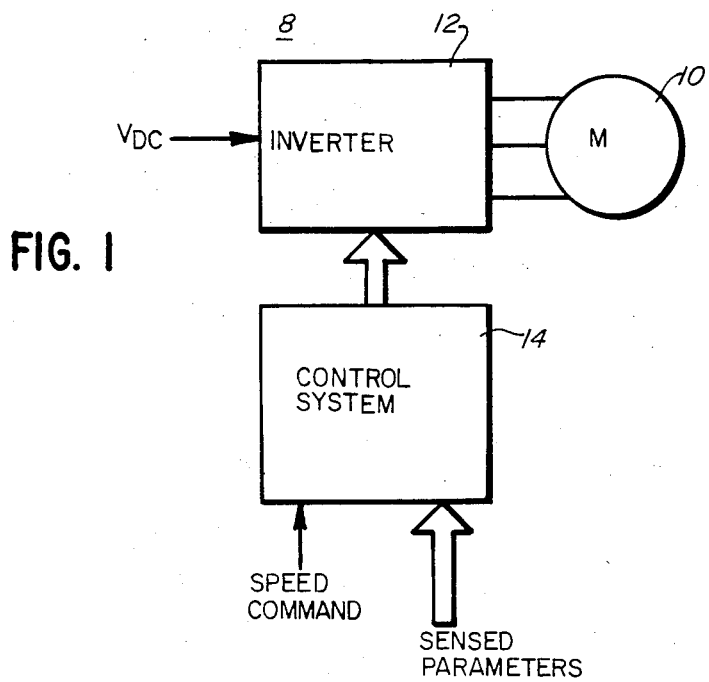
FIG. 1 is a block diagram of an AC motor drive system including the control system of the present invention.

Referring now to FIG. 1, there is illustrated an AC variable speed motor drive 8 which is utilized to control a motor 10. The motor drive includes a static inverter 12 for converting a DC voltage $V_{DC}$ into polyphase AC power which is applied to the motor 10. The inverter 12 includes switches which are operated by a control system 14 in accordance with an input speed command and a plurality of sensed parameters, such as the output current of the inverter and the voltage $V_{DC}$.

Figure 2:
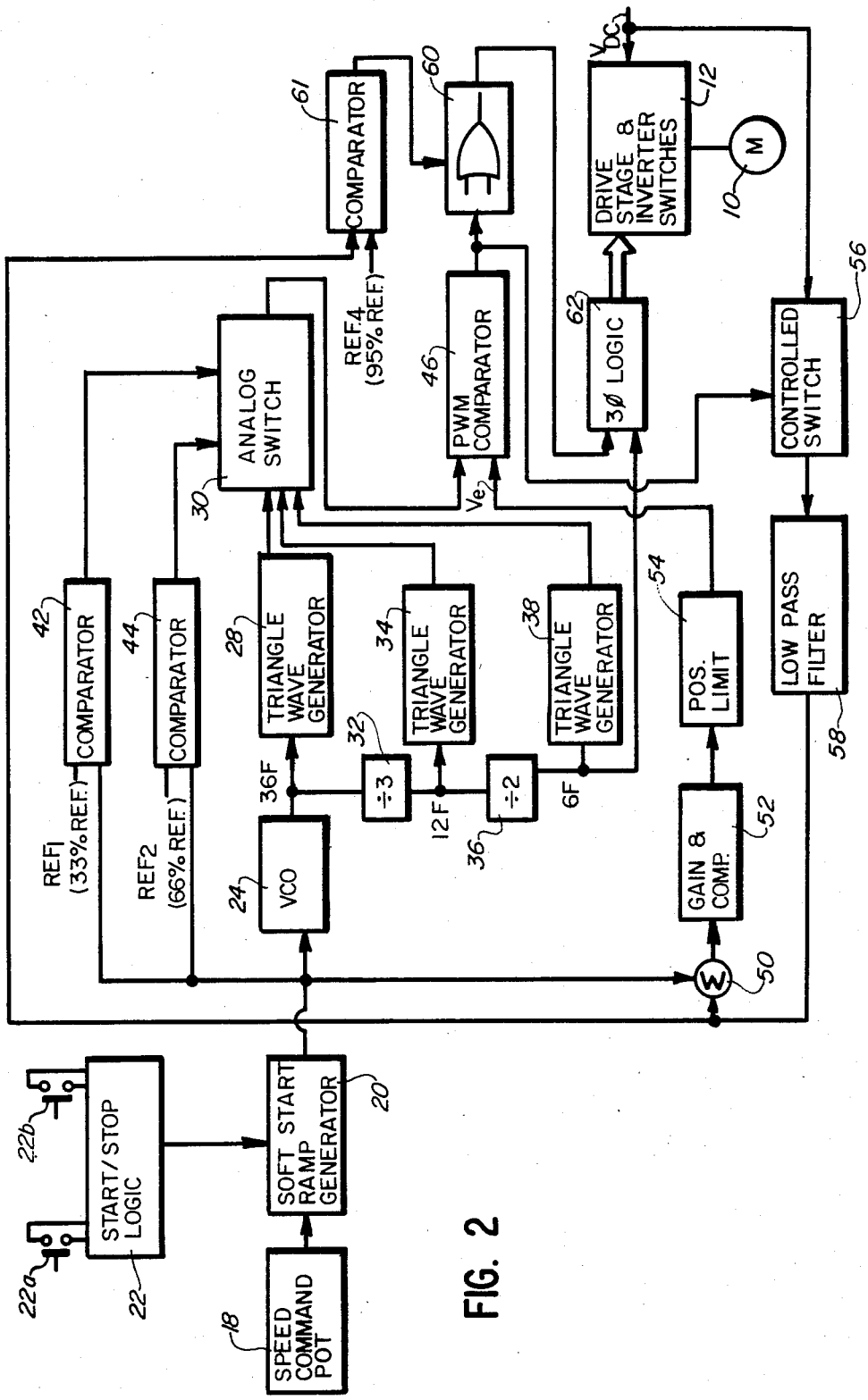
FIG. 2 is a block diagram of a portion of the control system illustrated in FIG. 1.

Referring now to FIG. 2, there is illustrated a portion of the control system 14 shown in block diagram form in FIG. 1 in conjunction with the inverter 12 and motor 10. The control system 14 includes means for entering input commands thereto, in the form of a speed command potentiometer 18 which is coupled to a ramp generator 20. The ramp generator 20 also includes an input from a start/stop logic circuit 22.

In the preferred embodiment, the ramp generator 20 effects a soft start function whereby the rate of change of signals from the speed command potentiometer 18 is limited. In the prefered embodiment, the ramp generator 20 includes an operational amplifier having a feedback capacitor connected in an integrator configuration. The voltage across the capacitor is maintained at a zero level by the start/stop logic 22 until a button 22a is depressed. When this occurs, the start/stop logic 22 allows the voltage across the feedback capacitor in the ramp generator 20 to increase in response to an increasing input from the speed command potentiometer 18.

In the event it is desired to stop the operation of the inverter and motor, a button 22b is depressed, which discharges the feedback capacitor and the ramp generator 20 and thereby causes the output of the ramp generator to drop to zero. The start/stop logic 22 also removes the control power from the components in the control system 14 so that the motor is stopped.

Coupled to the output of the ramp generator 20 is a voltage controlled oscillator, or VCO 24. The VCO 24 converts the voltage output of the ramp generator 20 into an oscillator signal at a frequency related to the output or fundamental frequency F of the inverter. In the preferred embodiment, this oscillator signal is at a frequency equal to 36 times the fundamental frequency F. This oscillator signal is applied to a first triangle wave generator 28 which generates a triangular wave having the same frequency as the oscillator output. The output of the triangle wave generator 28 is coupled to a first input of an analog switch 30.

The output of the oscillator is also coupled to a first divide-by-n frequency divider network 32 where, in the preferred embodiment, n=3. The output of the divide-by-n circuit 32 is therefore a signal at a frequency equal to twelve times fundamental frequency. This signal is applied to a second triangle wave generator 34, which in turn develops a triangular waveform at a frequency 12×F. This waveform is coupled to a second input of the analog switch 30.

The output of the divide-by-n circuit 32 is also coupled to a second divide-by-n circuit. In the preferred embodiment, n=2 for the circuit 36, and hence the output thereof is a signal at a frequency equal to 6×F, which signal is applied to a third triangle wave generator 38. The third triangle wave generator 38 develops a triangular waveform which is applied to a third input of the analog switch 30.

The VCO 24, divide-by-n circuits 32,36 and triangle wave generators 28,34,38 together comprise means for generating a plurality of waveforms at different frequencies which are integer multiples of the output frequency.

The analog switch 30 also includes at least one and preferably two control inputs which receive signals from first and second comparators 42,44. The first comparator 42 compares the output of the ramp generator 20 with a first reference, denoted REF$_1$, which represents 33% of the rated or maximum output frequency of the inverter. In a similar fashion, the second comparator 44 compares the output of the ramp generator 20 with a reference signal REF$_2$ which represents 66% of the maximum or rated output frequency.

The comparators 42,44 comprise means for developing range signals indicative of whether the inverter output frequency is above at least one predetermined frequency. Preferably, the comparators 42,44 comprise means for developing signals which identify which of three frequency ranges the inverter output frequency is in.

The analog switch 30 acts as selecting means to pass one of the three waveforms from the triangle wave generators 28,34,38 to a first input of a pulse width modulation, or PWM comparator 46 in dependence upon the state of the signals developed by the first and second comparators 42,44.

A second input of the comparator 46 receives an error signal V$_e$ representing the deviation of the output voltage supplied to the motor from the voltage required to maintain a desired V-to-F relationship in the output of the inverter. The signal V$_e$ is derived by a summing junction 50, a gain and compensation circuit 52 and a positive limit circuit 54. A first input of the summing junction 50 receives a signal from a controlled switch 56 and a low pass filter 58. The controlled switch 56 is operated by the output of the PWM comparator 46 so that the output of the controlled switch 56 corresponds to the output of one phase of the inverter. The low pass filter 58 converts the output of the control switch 56 into a DC signal which represents the motor voltage and which also represents the inverter output frequency.

A second input to the summing junction 50 is coupled to the output of the ramp generator 20, which output represents the output voltage necessary to maintain the desired V-to-F relationship. The summing junction subtracts the output of the low pass filter 58 from the output of the ramp generator 20 and provides this signal via the gain and compensation circuit 52 to the input of the positive limit circuit 54. The output of the positive limit circuit 54 is limited to a particular value when the output frequency of the inverter is at or above 90% of the rated output, as noted more specifically below.

The output of the PWM comparator 46 is coupled to a full on logic circuit 60 which, in the preferred embodiment, comprises an OR gate. A second input to the full on logic circuit 60 receives a comparison signal from a comparator 61 which compares the output of the low pass filter 58 representing inverter output frequency with a reference signal REF$_4$, which is derived from the DC voltage V$_{DC}$ and which represents 95% of rated output frequency. The full on logic circuit 60 operates the inverter switches in the "full on" or unmodulated mode when output frequency is at or above 95% of rated frequency.

The output of the full on logic circuit 60 is coupled to a first input of a three phase logic circuit 62. A second input of the three phase logic circuit 62 is coupled to the output of the divide-by-n circuit 36. The three phase logic circuit generates three phase timing waveforms which are utilized to control the switches in the inverter. The three phase logic 62 creates the necessary 120° phase relationship in the outputs of the inverter, as is conventional, and modulates the AC output with the PWM signal from the comparator 46.

The output of the three phase logic circuit 62 is coupled to a drive stage in the inverter 12, which develops the necessary signal levels to operate the switches.

The operation of the circuit shown in FIG. 2 will now be described in conjunction with the graph of FIG. 3 which illustrates the relationshp between PWM frequency, fundamental frequency and output voltage. In general, a particular relationship is established between the fundamental frequency and the output voltage of the inverter. This relationship is linear in a substantial portion of the range of available output frequencies of the inverter. This relationship is maintained by the control loop which includes the circuits 50, 52, 54, 46, 60 and 62.

When a start command is issued, such as by depressing the switch 22a and providing a speed command input to the ramp generator 20, the VCO 24 generates an oscillator signal which causes the inverter to operate at a frequency which is a small percentage of the rated output frequency, such as 1% or 2% of rated. This operation is effected through the divide-by-n circuits 32,36 and the three phase logic circuit 62.

When the inverter output frequency is in a range between 1% or 2% and 33% of the rated frequency, the output of the comparators 42,44 are both in a low state and hence the analog switch 30 passes the waveform generated by the triangle wave generator 28 to the PWM comparator 46. The comparator 46 thereby modulates the AC output of the inverter with a pulse width modulating signal derived from the output of the triangle wave generator 28.

When the inverter output frequency is between one-third and two-thirds of rated output frequency, the output of the comparator 42 is in a high state while the output of the comparator 44 is in a low state. In response to this combination of control inputs, the analog switch 30 passes the output of the triangle wave generator 34 to the PWM comparator 46. The AC output of the inverter is thereby modulated by a pulse width modulating signal having a frequency equal to twelve times the fundamental or output frequency of the inverter.

When the inverter output frequency is above 66% of rated output frequency, the outputs of both comparators 42,44 are in a high state, in turn causing the analog switch 30 to pass the output of the triangle wave generator 38 to the PWM comparator 46. The PWM comparator 46 pulse width modulates the AC output of the inverter with a pulse width modulating signal having a frequency equal to six times the fundamental frequency.

When the inverter output frequency is greater than 90% but less than 95% of rated output frequency, the output $V_e$ of the positive limit circuit 54 is limited to the predetermined value. Also, during this time the analog switch 30 couples the output of the triangle wave generator 38 to the PWM comparator 46. This in turn causes the AC output of the inverter to be modulated at a constant duty ratio as the fundamental frequency is varied between 90% and 95% of rated frequency.

The point above which the duty ratio is held constant (90% in the illustrated embodiment) is selected in accordance with the minimum off time required for the switching devices in the inverter. In the illustrated embodiment, the inverter utilizes high power bipolar transistors having a minimum off time of 15 microseconds at a rated frequency of 1.1 kilahertz. In this case, the minimum off time is reached at 90% of rated frequency.

When the inverter output frequency is between 95% and 100% of rate frequency, the output of the full on circuit 60 assumes a high state, in turn causing the switches in the inverter to be operated in the full on mode. In such mode, the output of the inverter is unmodulated and only the fundamental frequency is varied.

The 95% point is also a function of the minimum off time of the inverter switches and is selected to be midway between the frequency point above which the duty ratio is held constant (90% in the illustrated embodiment) and rated frequency.

The positive limit circuit 54 and the full on logic circuit 60, therefore, together comprise means for maintaining the inverter output voltage constant (albeit at two different levels) when the inverter output frequency is above 90% of rated.

Figure 3:
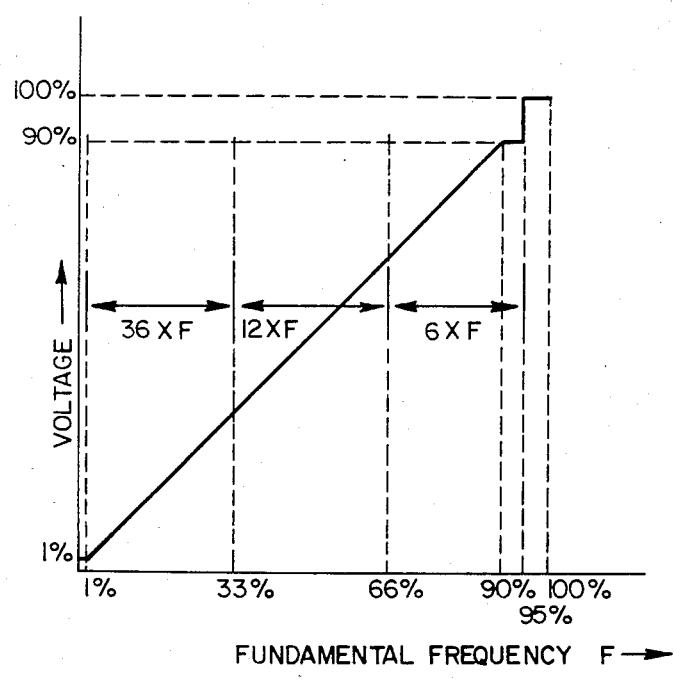
FIG. 3 is a graph illustrating the relationship between output frequency, PWM frequency and output voltage afforded by the control illustrated in FIG. 2.

It should be noted that the particular V-to-F relationship illustrated in FIG. 3 is exemplary only, as are the illustrated ranges in which the PWM frequency is an integer multiple of six of the fundamental frequency. These relationships can be modified, if desired.

The circuitry shown in FIG. 2 is also effective to prevent re-entry into the PWM mode from the full on mode when the battery voltage drops to a point which is insufficient to support the commanded speed of the motor. In such a case, it is desirable to simply reduce the fundamental frequency of the output of the inverter rather than re-enter the PWM mode.

Assume that the inverter output fundamental frequency is in a range between 95% and 100% of rated frequency. Also, assume that the battery discharges so that the output voltage thereof drops below 95% of full voltage, in turn causing a decrease in the voltage coupled to the motor. As previously mentioned, the signal REF4 is derived from the output voltage of the battery. Therefore, a drop in the output voltage of the battery (and hence the inverter output voltage) causes a corresponding drop in this reference signal. As a result, the signal REF4 coupled to the comparator 61 will drop as the output of the low pass filter 58 drops due to discharging of the battery. This insures that, under this condition, the signal REF4 will never become less than the output of the low pass filter 58. Hence, the output of the full on circuit 60 continues in a high state, in turn causing continued operation of the switches of the inverter in the full on mode.

We claim:

1. A control for an inverter in a variable speed AC motor drive, the inverter converting a DC input voltage into an AC output for energizing a motor, the frequency of the AC output and hence the speed of the motor being controlled in accordance with an input command, comprising:
    a voltage controlled oscillator (VCO) coupled to the input command for generating an oscillator signal at an integer multiple of the output frequency of the inverter;
    a first triangle wave generator coupled to the output of the VCO for generating a first triangle waveform at a frequency equal to the frequency of the oscillator signal;
    a first divide-by-n circuit coupled to the output of the VCO for reducing the frequency thereof so that the output of the first divide-by-n circuit is a signal at a frequency equal to an integer multiple of the output frequency;
    a second triangle wave generator coupled to the output of the first divide-by-n circuit for generating a second triangle wave at a frequency equal to the frequency of the output of the divide-by-n circuit;
    an analog switch having inputs coupled to the outputs of the first and second triangle wave generators, a control input and an output;
    means coupled to the control input of the analog switch for developing a signal indicative of whether the inverter output frequency is greater than a predetermined frequency;
    means coupled to the output of the analog switch for modulating the inverter output with a pulse width modulating signal derived from one of the triangle waveforms selected in accordance with the signal coupled to the control input of the analog switch;
    means for maintaining a linear relationship between inverter output voltage and output frequency in a particular range of output frequencies; and
    means for maintaining inverter output voltage constant when the inverter output frequency is above the particular range including means for operating the inverter in a full on mode when the inverter output frequency is above a predetermined frequency.

2. The control of claim 1, wherein the full on mode operating means comprises an OR gate having a first input coupled to the output of the PWM comparator and a second input which receives a signal representing whether the output frequency is above a reference signal representing a predetermined frequency.

3. The control of claim 2, wherein the DC voltage is obtained from a battery and wherein the reference signal is derived from the voltage of the battery so that, as the battery voltage decreases to a point where it can no longer sustain the commanded speed of the motor, the reference signal drops in a corresponding fashion with the voltage output of the battery so that re-entry into the PWM mode of operation of the inverter is prevented.

* * * * *